US008718157B2

(12) United States Patent
Tosato et al.

(10) Patent No.: US 8,718,157 B2
(45) Date of Patent: May 6, 2014

(54) DUAL INDICATOR SCHEME FOR CHANNEL STATE INFORMATION FEEDBACK

(75) Inventors: Filippo Tosato, Bristol (GB); Yong Sun, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 204 days.

(21) Appl. No.: 13/081,832

(22) Filed: Apr. 7, 2011

(65) Prior Publication Data

US 2011/0249763 A1 Oct. 13, 2011

(30) Foreign Application Priority Data

Apr. 7, 2010 (GB) .................................. 1005793.3

(51) Int. Cl.
*H04K 1/10* (2006.01)

(52) U.S. Cl.
USPC ........... 375/260; 375/262; 375/271; 375/295; 375/316; 375/340

(58) Field of Classification Search
USPC ......... 375/260, 262, 267, 271, 295, 298, 299, 375/302, 316, 322, 328, 340, 342, 344, 345, 375/347
See application file for complete search history.

(56) References Cited

U.S. PATENT DOCUMENTS

| 7,656,969 | B2 * | 2/2010 | Strong | 375/316 |
|---|---|---|---|---|
| 8,442,140 | B2 * | 5/2013 | Zhou et al. | 375/267 |
| 8,472,547 | B2 * | 6/2013 | Hammarwall et al. | 375/267 |
| 2006/0039493 | A1 * | 2/2006 | Mukkavilli et al. | 375/267 |
| 2009/0252091 | A1 | 10/2009 | Tang et al. | |
| 2009/0274225 | A1 | 11/2009 | Khojastepour et al. | |
| 2011/0122971 | A1 * | 5/2011 | Kim et al. | 375/316 |
| 2012/0003945 | A1 * | 1/2012 | Liu et al. | 455/115.1 |
| 2012/0270535 | A1 * | 10/2012 | Chen et al. | 455/422.1 |
| 2012/0300656 | A1 * | 11/2012 | Cui et al. | 370/252 |
| 2012/0314667 | A1 * | 12/2012 | Taoka et al. | 370/329 |
| 2012/0320774 | A1 * | 12/2012 | Dai et al. | 370/252 |

FOREIGN PATENT DOCUMENTS

| JP | 2008-125068 | 5/2008 |
|---|---|---|
| JP | 2008-125069 | 5/2008 |
| JP | 2008-136199 | 6/2008 |
| JP | 2009-33744 | 2/2009 |
| JP | 2009-71825 | 4/2009 |
| JP | 2010-516215 | 5/2010 |
| JP | 2010-517463 | 5/2010 |

(Continued)

OTHER PUBLICATIONS

Office Action issued Sep. 11, 2012 in United Kingdom Patent Application No. GB1005793.3.
Combined Search and Examination Report under Section 17 & 18(3) dated Jul. 29, 2010 for Application No. GB1005793.3.
R1-100051, 3GPP TSG-RAN WG1 #59, Ericsson, ST-Ericsson, A Flexible Feedback Concept, Valencia, Jan. 18-22, 2010.

(Continued)

*Primary Examiner* — Hirdepal Singh
(74) *Attorney, Agent, or Firm* — Oblon, Spivak, McClelland, Maier & Neustadt, L.L.P.

(57) ABSTRACT

Codebook based communication of precoding data between two stations involves determining a 'best fit' precoding at a receiving station, on the basis of channel state measurements taken therein. The best fit precoding is compared with pre-agreed entries in a codebook, and an indicator is sent back to the terminal emitting the analysed signal. The determination is separated into two elements, one being sufficient for use with SU-MIMO, and another being provided, with a second codebook indicator, if MU-MIMO is to be employed. This second codebook indicator points to a codebook of eigenvector representations for the multi-user space in which the channel is persisting.

12 Claims, 4 Drawing Sheets

(56) References Cited

FOREIGN PATENT DOCUMENTS

| | | |
|---|---|---|
| WO | WO 2008/126378 A1 | 10/2008 |
| WO | WO 2008/144189 A2 | 11/2008 |
| WO | WO 2008/147121 A1 | 12/2008 |
| WO | WO 2009/002269 A1 | 12/2008 |
| WO | WO 2009/030036 A1 | 3/2009 |
| WO | WO 2009/096708 A1 | 8/2009 |
| WO | WO 2009/131376 A2 | 10/2009 |
| WO | WO 2011/065898 A2 | 6/2011 |
| WO | WO 2011/065898 A3 | 6/2011 |

OTHER PUBLICATIONS

R1-091288, 3GPP TSG RAN WG1 #56, Philips, "CSI feedback improvements for LTE-A based on multiple codebooks", Seoul, Mar. 23-27, 2009.

Fang Shu et al., "Dual Codebook Based Multi-User MIMO Precoding and Scheduling Scheme with Limited Feedback", pp. 19-23, Jul. 23-25, 2009.

Notice of Reasons for Rejection issued Oct. 9, 2012 in Japanese Patent Application No. 2011-085188 (with English translation).

* cited by examiner

DUAL INDICATOR SCHEME FOR CHANNEL STATE INFORMATION FEEDBACK

FIELD

Embodiments described herein relate to feedback of channel state information (CSI) in wireless communication.

Efficient limited feedback of channel state information (CSI) has long been regarded as a crucial requirement to achieve the very high spectral efficiency predicted in cellular mobile systems employing multiple-antenna technology. The way CSI feedback enables this is by providing a multiple-antenna transmitter with the ability to form a beam or multiplex multiple beams towards one or more destinations, thereby achieving a beamforming and multiplexing gain in the spatial domain.

Since this fundamental role of CSI at the transmitter was recognised, great attention has been devoted in standardisation bodies, such as that drafting the 3GPP standard, to define feedback mechanisms in support of multiple antenna techniques. In this respect, the primary design target within the long-term evolution (LTE) standardisation has been to minimise the overhead in terms of the control information required to deliver such CSI feedback, whilst providing an effective support to single-user (SU) and multi-user (MU) MIMO operations.

In the recent effort to improve further the LTE system performance to respond to the ITU requirements in the IMT-Advanced call for proposals, enhancing the feedback mechanism has been identified by the 3GPP as a major work item for the so-called LTE-Advanced release.

BRIEF DESCRIPTION OF DRAWINGS

A specific embodiment will now be described, with reference to the accompanying drawings, in which.

DETAILED DESCRIPTION

One common view is that MU-MIMO schemes could benefit most from improved CSI feedback, because they are generally more sensitive to inaccurate channel reports and mismatches between the real channel conditions and the knowledge available at the transmitter. However, it is also widely accepted that improving MU-MIMO performance and, in general, the interference rejection capability of the eNodeB should not compromise the performance of SU-MIMO schemes. A wealth of proposals have been put forward to improve the feedback mechanism in LTE-Advanced.

One issue pertinent to the present technical field is that the precoder in LTE-Advanced should be derived as a combination of two feedback messages, one targeting the long-term/wideband channel statistics, the other targeting the short-term/frequency-selective channel properties.

According to one embodiment a precise combination of new feedback indicators is provided, and also a method to generate and combine these messages to boost LTE-A MU-MIMO performance, without impairing SU-MIMO.

Another embodiment provides a method to describe the properties of a multiple-input multiple-output channel by generating two feedback indicators identifying a set of precoders or an individual precoder. In this embodiment, the first indicator may be designed to restrict the space wherein the precoder identified by the second indicator can be selected. The two feedback indicators can be associated with different frequency sub-bands and time frames within the time-frequency resources configured in the communication network.

The first feedback indicator can comprise a codebook index selected from a codebook of unitary matrices of a given rank. The index can be calculated in a transformed domain. This transformation can be such that all unitary precoders of a given rank that are bases of the same space (i.e. linear combinations of one another) are mapped to a single point in the transformed domain. The precoder codebook used for the first feedback indicator can be mapped off-line to the said transformed domain and stored in the terminal memory. The metric used for the codebook index selection can be such that the minimum (or maximum) value corresponds to the case of mutually orthogonal unitary matrices whilst the maximum (or, respectively, the minimum) value corresponds to the case of two unitary matrices spanning the same vector space.

In the above arrangement, the second feedback indicator may consist of a codebook index selected from a codebook of unitary matrices of a rank smaller or equal to that of the first indicator. The elements of this second codebook may be interpreted by a terminal as linear combinations of the columns of any element of the first codebook in such a way that the precoder evaluated for the index selection is formed by the product of the first feedback matrix and the test matrix from the second codebook. The codebook index from this second codebook can then be selected by maximising (or minimising) a metric relative to the precoders so calculated in their original domain.

Moreover, in general terms, an embodiment comprises determining, at a receiver, a channel precoder appropriate for use in transmission to that receiver, determining, on that basis, which of a plurality of stored sets of eigenvectors best fits that channel precoder, and which, of a plurality of stored matrices which when combined with said stored sets of eigenvectors, produce specimen precoders, is most suitable for use in constructing a precoder, and sending to a transmitter of a signal to said receiver an indication of each of the determined stored set of eigenvectors and the determined stored matrix such that, at corresponding codebooks, said stored set of eigenvectors and stored matrix can be retrieved at said transmitter for construction of a precoder accordingly.

Another embodiment comprises determining, at a receiver, a channel precoder appropriate for use in transmission to that receiver, determining, on that basis, which of a plurality of stored sets of eigenvectors best fits that channel precoder, and sending to a transmitter of a signal to said receiver an indication of the determined stored set of eigenvectors such that, at a corresponding codebook of the transmitter, said stored set of eigenvectors can be retrieved at said transmitter for construction of a precoder accordingly.

Another embodiment comprises determining, at a receiver, a channel precoder appropriate for use in transmission to that receiver, determining, on that basis, which of a plurality of stored matrices is most suitable for use in constructing a precoder, and sending to a transmitter of a signal to said receiver an indication of the determined stored matrix such that, at a corresponding codebook of the transmitter, said stored matrix can be retrieved at said transmitter for construction of a precoder accordingly.

While the various embodiments described herein can be provided on or by original equipment, it may also be convenient to implement an embodiment by means of software loaded on a general purpose computer, or a computing device with specific adaptations to the field but without features specific to the provision of the embodiment itself. Thus, an embodiment could comprise a computer program product operable to be executed on a computer to provide an embodiment in its entirety, or to complement (i.e. update) existing software and/or hardware components, features or tools to provide that embodiment. The computer program product may be supplied on a computer readable medium, such as a storage medium or a computer readable memory device, or may be supplied as borne on a computer receivable signal.

Figure 1:
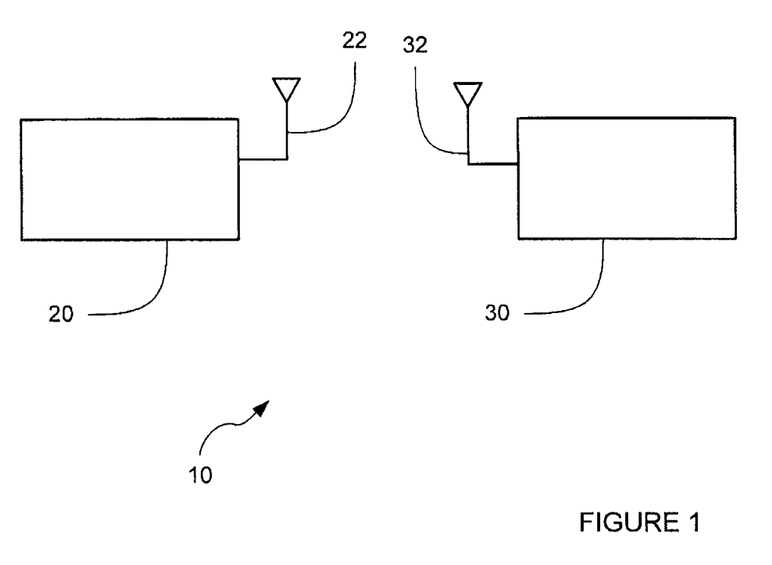
FIG. 1 is a schematic diagram of a communications network.

As illustrated in FIG. 1, a schematic wireless communications system 10 comprises two wireless communications devices 20, 30 with respective antennas 22, 32, each capable of emitting and detecting wireless communications signals. To that extent, they can be described as transceivers.

Figure 2:
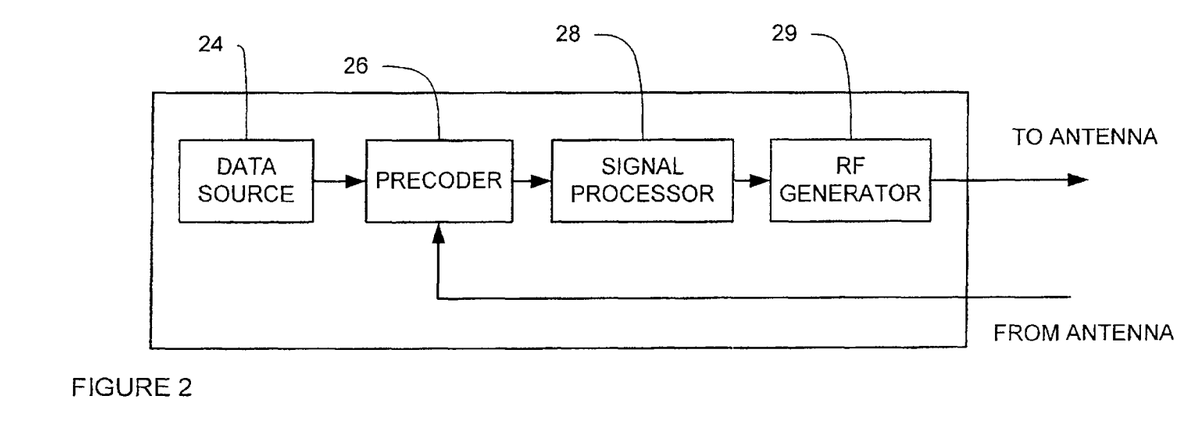
FIG. 2 is a schematic diagram of a communications transceiver highlighting signal transmission elements thereof.
Figure 3:
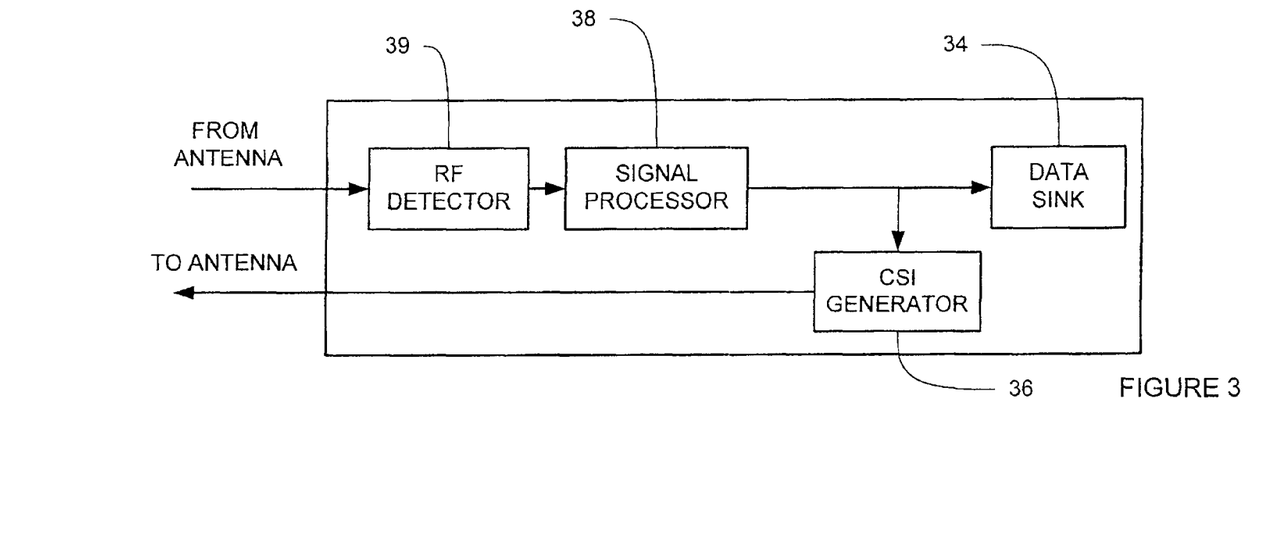
FIG. 3 is a schematic diagram of a communications transceiver highlighting signal reception elements thereof.

As illustrated in FIG. 2, one of the transceivers is shown, with elements thereof employed in the generation of a signal for emission highlighted. In FIG. 3, the other of the transceivers is shown, with elements thereof employed in the reception and detection of a signal highlighted. It will be appreciated that, in a practical example, each transceiver will include all elements illustrated in the two drawings, but that the illustrations are simplified for clarity.

As illustrated in FIG. 2, a data source 24 generates data to be transmitted to another station. This is precoded by a precoder 26, configured by information fed back from the other station and received on the antenna 22. A signal processor 28 prepares the precoded information for transmission, and an RF generator 29 puts the processed information onto an RF signal to be transmitted at the antenna.

Similarly, the transceivers in a receive mode also comprise an RF detector 39 operable to detect RF signals received at the antenna 32. This detected signal is processed in a signal processor 38, for reception at a data sink 34. The state of the channel is measured on the basis of reception of certain portions of the signal which may be known at the receiver (such as preambles, pilot symbols and so on) for determination of channel state information in a CSI generator 36. This CSI is sent back to the transmitter of the received signal for use in future transmissions.

In the present embodiment, the mobile terminal illustrated in FIG. 3 is capable of measuring a multiple antenna channel, e.g. by means of cell-specific reference signals provided by a cell eNodeB (in LTE terminology). The terminal can then generate two distinctive feedback indicators from those measurements, by adopting the following procedure.

An Indicator 1 is intended to represent any linear combination of the few strongest channel directions, as seen by the terminal, which are referred to here as channel eigenvectors. Channel eigenvectors can be obtained by the terminal in one of several ways, for example by a singular-value decomposition of the instantaneous matrix of channel measurements H, by an eigenvalue decomposition of the Gram matrix $HH^H$, or by an eigenvalue decomposition of the channel correlation matrix $E\{HH^H\}$. However, the manner in which this matrix of eigenvectors is calculated is well documented in the technical literature. The main premise on which the present embodiment operates is that such an orthonormal matrix is available at the terminal.

The number of channel eigenvectors used for calculating Indicator 1 is determined by the reported rank of Indicator 1, which can be a parameter configured by the network and may vary from a minimum of 2 to a maximum equal to number of transmit antennas configured at the eNodeB. This set of strongest eigenvectors represents the best possible precoder for the given rank and channel measurements, prior to any quantisation or compression operation. In other words, if unlimited feedback resources were available, the terminal would hypothetically signal this matrix of eigenvectors as the preferred precoder.

In practice, Indicator 1 consists of a codebook index derived by selecting the best representative element from a codebook. The distance metric used for the selection of Indicator 1 from the codebook is invariant to post-multiplication of either or both terms in the distance calculation by any orthonormal matrix. In other words, Indicator 1 reflects properties of any linear combination of the given channel eigenvectors, i.e. it provides a representation of the range space spanned by those eigenvectors (or, equivalently, their null space).

In more detail, a transformation is provided to map the original unquantised precoder (aka matrix of eigenvectors) to a transformed domain where the metric is defined. The original codebook for Indicator 1 may be defined in the precoder domain; therefore, the codebook elements too have to be mapped to the transform domain before the metric calculation. However, for the codebook, the transformation can be done off-line, thereby providing a transformed version of the codebook, which can be stored in the terminal memory (not illustrated in FIGS. 1-3).

In one implementation, the transformation is defined as follows.

In this description, n is the number of transmit antennas, p is the reported rank for Indicator 1 and Y is the n×p orthonormal matrix of strongest eigenvectors, whose columns are the p vectors, $y_p$. Y is partitioned in two blocks, the top p×p block $Y_p$ and the bottom (n-p)×p block $Y_{n-p}$. The transformation t(Y) is given by $$t(Y)=Y_{n-p}VU^H, \qquad (1)$$

where the last two matrices are defined by the SVD of $Y_p$, $Y_p=U\Sigma V^H$. The dimension of the transformed domain is reduced compared to the original precoder domain as the size of t(Y) is (n-p)×p. The same transformation is applied off-line to the n×p codebook elements: $\{C_1, C_2, \ldots\}$. The distance metric $g_c$ is then defined in transformed domain as $$g_c(Y,C_i)=\text{real}(\text{trace}(t(Y)^H t(C_i)))/(\|t(Y)\|_F\|t(C_i)\|_F), \qquad (2)$$

where $\|.\|_F$ denotes the Frobenius norm. It will be observed that the above metric can be interpreted as an extension of the inner product between two "lines" to multi-dimensional complex sub-spaces: if the two matrices Y and $C_i$ span the same range space, then $g_c=1$, if their spaces are orthogonal, then $g_c=0$. The codebook index which constitutes Indicator 1 is finally obtained from the following quantisation operation $$\text{"Indicator 1"}=Q1=\arg\max_i\{g_c(Y,C_i)\}. \qquad (3)$$

In an alternative implementation, the above codebook index selection operation can be replaced by the following Euclidean distance minimisation $$\text{"Indicator 1"}=Q1=\arg\min_i\{\|t(Y)-t(C_i)\|_F\}, \qquad (4)$$

after realising that the two operations yield the same result if the codebook elements are normalised such that $\|t(C_i)\|_F=1$, without loss of generality.

As a special case, Indicator 1 can be associated with the identity matrix. In one implementation, this special case can be semi-statically configured by the network such that the terminal is not required to generate and signal Indicator 1.

Indicator 1 can be accompanied by a so-called channel quality indicator (CQI) that reports the SINR level predicted by the terminal. This CQI can denote the received SINR in the hypothesis that $C_o$ is used as precoder and for a given decoder (MMSE, MMSE-decision feedback equaliser, maximul-likelihood etc.). Alternatively the associated CQI can indicate an average SINR, or a maximum/minimum SINR, across the range of possible precoders obtained as linear combinations of the columns of $C_{Q1}$. Note that the rank assumed for the CQI calculation need not be the same as that of Indicator 1.

Indicator 2 is intended to be used in conjunction with Indicator 1 to specify an individual precoder, obtained as a linear combination of the basis vectors reported by Indicator 1. Indicator 2 is a representation of an orthogonal matrix of size $r_1 \times r_2$, where $r_1$ is the rank of Indicator 1 and $r_2 \le r_1$ is the rank of Indicator 2.

In practice, Indicator 2 is also a codebook index drawn from a different codebook: $\{D_1, D_2, \ldots\}$. The metric used for selecting the codebook index is different from the metric used for Indicator 1: this time the metric should reflect the actual SINR when using the precoder under test and the actual decoder in use by the terminal, i.e. a CQI metric. The precoder under test is given by $$P_k = C_{Q1} D_k. \quad (5)$$

the SINR value predicted by the terminal under the hypothesis of precoder $P_k$ and a given decoder architecture is denoted $CQI(P_k)$. Then, Indicator 2 is selected as follows:

$$\text{"Indicator 2"} = Q2 = \arg\max_k CQI(P_k) \quad (6)$$

As a special case, Indicator 2 can be associated with the identity matrix. In a preferred implementation, this special case can be semi-statically configured by the network such that the terminal is not required to generate and signal Indicator 2.

Indicator 2 may also be accompanied by the CQI value corresponding to the selected codebook element.

A process of multiplexing of the feedback indicators will now be described. The two distinctive components of the feedback information can be multiplexed in time and frequency depending on the network configuration. Typically, one feedback report may consist of a combination of one or multiple instances of Indicator 1 or Indicator 2 or both. Each individual message describes the channel conditions on a specific sub-band of the configured bandwidth and a specific time frame. The mapping between the feedback messages and sub-bands, the periodicity of the feedback reports and the composition of each report, in terms of one indicator or the other or both, can all be configured by the network in a semi-static way. The periodicity and the frequency granularity of Indicator 1 and Indicator 2 can be different: as an example, Indicator 1 can be updated less frequently and/or on a wider sub-band, whereas Indicator 2 can be configured with a finer granularity in time and frequency.

In use, a base station, such as the eNodeB of LTE standardised implementations, is the intended destination of the feedback indicators. These can be utilised in three possible ways, the last two of which can be regarded as special cases of the first.

1) Combination of the two messages. The eNodeB can reconstruct the preferred precoding matrix signalled by a terminal, for the configured sub-band and time frame, by combining the two indices, Q1 and Q2, as follows:

$$P = C_{Q1} D_{Q2}.$$

In this case, the codebooks are known to both the terminals and the eNodeB. The precoder so reconstructed is primarily intended for SU-MIMO operation, where it is important to maximise the beamforming gain at the terminal, which can be accurately predicted by the terminal itself in the absence of unwanted interferers.

2) Use of Indicator 1 only. This case is primarily applicable to MU-MIMO operation or interference avoidance transmission schemes, where it is crucial to achieve the best possible layer separation for minimal cross-layer interference. Indicator 1 informs the eNodeB of the range space spanned by the strongest channel directions, or, equivalently, the main null space of the channel, such that the eNodeB can apply such design criteria as (block)-zero forcing to position each layer along the null space of any victim users. This manner of operation may be the only one possible when Indicator 2 is not configured by the network, i.e. it is associated with the identity matrix.

3) Use of Indicator 2 only. This case is primarily applicable to SU-MIMO. The only difference from case 1) is that Indicator 1 is not configured by the network, i.e. it is associated with the identity matrix. The reason for allowing this mode may be for backward compatibility and/or when a small number of transmitted antennas are supported by the eNodeB, e.g. 2, which makes the signalling of Indicator 1 superfluous.

The main benefit of the dual feedback mechanism described herein is that of providing enhanced support for both SU- and MU-MIMO operations by delivering two separate feedback messages designed for two different needs.

In particular Indicator 1 targets the CSI component that is crucial for layer separation, which is the main objective in interference limitation techniques like MU-MIMO. Indicator 1 conveys information on the range space spanned by the strongest channel eigen-directions (or equivalently the principal components of the null space).

On the other hand Indicator 2 singles out one preferred precoder from the infinite set of precoders that are linear combinations of the codebook element indicated by Indicator 1. This selection allows to maximise the beamforming gain as seen by the terminal, which can accurately predict the SINR in absence of co-scheduled users. Therefore, this feedback message is well suited for SU-MIMO operation where all the transmission layers are destined to the same user.

This dual feedback provides a flexible way of either dynamically switching between SU- and MU-MIMO or semi-statically configuring the terminals for one mode or the other. In fact, if the terminals are configured to report both messages, then the eNodeB can dynamically change transmission mode from SU- to MU-MIMO and vice versa. On the other hand, if Indicator 1 is replaced by the identity by network configuration, then the feedback targets SU-MIMO operations more precisely. Similarly, if Indicator 2 is replaced by the identity by network configuration, then the feedback provides specific support for MU-M IMO.

It is worth commenting further on the fundamental difference between the two feedback messages. Both indicators consists of a codebook index. However, the selection mechanism is different. For Indicator 1, firstly the strongest channel eigen-directions (aka unquantised precoder) are mapped to a transformed domain, such that all linear combinations of these directions are mapped to a single point. The codebook element is then selected in the transformed domain to maximise (or minimise, depending on the metric definition) a newly defined metric that measures the "degree of orthogonality" between vector spaces. On the other hand, for Indicator 2, the terminal simply selects the precoder from the codebook with the best performance in terms of SINR. However, this search is restricted to the linear combinations of the basis vectors identified by the Indicator 1. If the first message is replaced by the identity and only Indicator 2 is generated, then the search space for the precoder is no longer restricted within the range space of the few strongest channel directions. In this case, the codebook used for Indicator 2 "samples" the null space of the channel as well as its range space, which makes the codebook less efficient—the codebook elements belonging to the null space are unlikely be selected as preferred precoders.

The feedback mechanism disclosed here can be adopted as a solution to the feedback extension problem in support of downlink multiple-antenna transmission for LTE-Advanced. More specifically, Indicator 1 and Indicator 2 can be defined as new precoding matrix indicators (PMIs).

Besides the more accurate channel description allowed by this dual feedback mechanism, this technology has some other desirable benefits:

The transformation (1) allows designing a transformed codebook with mostly real or imaginary coefficients, thereby reducing greatly the number of operations required by the selection (3) or (4). Moreover, the original codebook can be chosen to avoid power imbalances between the transmit antennas by guaranteeing equal power allocation to all antenna elements. As an example, the 4-transmit antenna codebook for LTE Release-8 have the property of assigning equal power to all transmit antennas. If transformation (1) is applied, the transformed version of the codebook has elements with zero or only real or only imaginary components. Codebooks with similar properties can be defined for higher number of antennas by using the "Householder reflections" or the DFT matrix as for LTE Release-8 codebooks.

Backward compatibility with Release-8 and 9 of LTE is also guaranteed by the described feedback mechanism. In fact, if Message 1 is configured to be the identity, then the LTE Release-8 feedback would be a special case of the proposed construction. Also the codebook design can be similar to that of previous LTE releases, as explained in the preceding paragraph, which facilitates the implementation.

Figure 4:
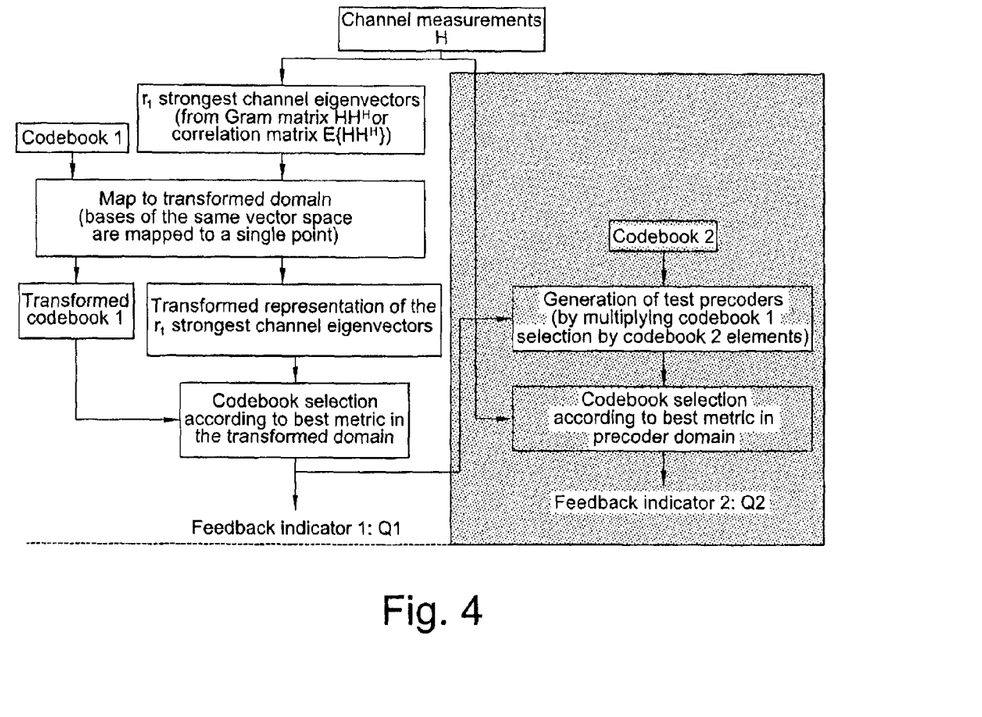
FIG. 4 is a flow diagram of a process of constructing indicators for feeding back to another transceiver.
Figure 5:
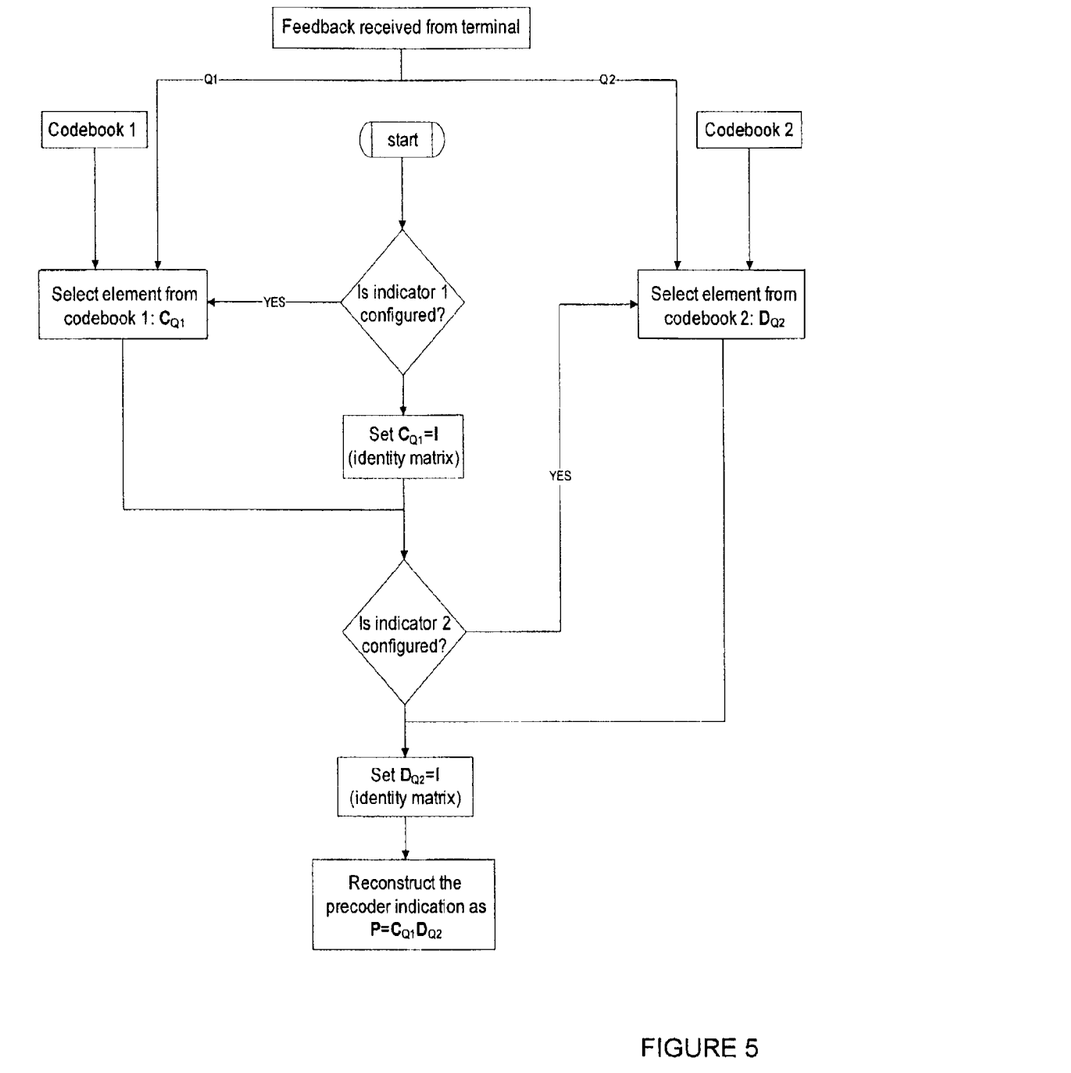
FIG. 5 is a flow diagram of a process of constructing a precoding matrix on the basis of received indicators from another source.

FIG. 4 shows a flow diagram illustrating a process for generating the two feedback messages. FIG. 5 shows a flow diagram of a process for combining the two feedback indicators to reconstruct a final precoder indication.

As shown in FIG. 4, channel measurements H are taken at the receiver, on the basis of known information, such as pilot symbols, contained in information transmitted thereto. On the left hand side of FIG. 4, a process for generating indicator 1 (Q1) is shown, comprising steps as set out above. On the right hand side, Indication 2 (Q2) is generated, making use of Q1 and a further codebook, Codebook 2, again as set out above.

If both feedback indicators are sent back to the transmitting terminal, then the whole process as shown in FIG. 5 ensues. If only Q2 is sent back, then the first decision taken in the process is straightforward and leads to $C_{Q1}$ being set to the Identity matrix. Otherwise, $C_{Q1}$ is looked up from Codebook 1 on the basis of Q1. If Q2 is configured, then codebook 2 provides the source for $D_{Q2}$ in the same way. The precoder indication is then set as the product of these two matrices.

While the invention has been described above with reference to specific embodiments thereof, nothing in the foregoing should be read as an implication that any special or particular technical elements need be provided in order to perform the invention. That is, aspects of the invention should be read as being characterised by the appended claims, which may be read in the context of, but not limited to, the above disclosure, with the aid of the accompanying drawings, and with due regard to inferences that a reader might make about equivalents to the literal reading of the terms of the claims.

The invention claimed is:

1. A wireless communications network comprising:
    first and second wireless transceiving stations,
    the first station comprising:
        first storage means storing a first codebook comprising a plurality of entries, each entry being a representation of a precoding for a transmission by that first station, and
        second storage means storing a second codebook;
    the second station comprising:
        a channel state measurement means for measuring state of a channel over which a wireless communication is borne from the first and second stations,
        third codebook storage means storing a third codebook comprising a plurality of entries, each entry of the third codebook comprising data representative of possible precodings, the entries of the third codebook corresponding to the entries of the first codebook,
        precoding selection means operable to select an entry from said third codebook;
        fourth codebook means storing a fourth codebook corresponding with the second codebook of the first station, wherein each entry in said fourth codebook is usable to specify a particular precoding from the possible precoding represented by an entry selected from the third codebook;
    a selecting device configured to select an entry in said fourth codebook by predicting the channel quality obtained when different entries in the fourth codebook are used to specify a precoding; and
    channel state indicator feedback means for transmitting from said second station to said first station a first indicator corresponding to the entry selected from the third codebook and a second indicator corresponding to the entry selected from the fourth codebook, to enable said first station to select a precoding on the basis of said indicators;
    wherein the second indicator enables said first station to select, from said second codebook, data representing criteria for a precoding to meet, such that the first station can construct a precoding within the criteria defined by the data from the second codebook with regard to the indicator corresponding to the entry in the first codebook.

2. A wireless communications network in accordance with claim 1, wherein the second wireless station comprises channel precoder determining means operable to determine a substantially ideal precoding on the basis of the measured channel state,
    wherein the substantially ideal precoding corresponds to a matrix of strongest channel eigenvectors, the channel precoder determining means being configured to transform the matrix of the strongest channel eigenvectors from an original domain to a transformed domain, wherein the dimension of the transformed domain is reduced compared to the original domain and
    the precoding selection means is operable to select the entry from said third codebook based on the transformed matrix of strongest channel eigenvectors.

3. A wireless communications network in accordance with claim 2 wherein each codebook entry in the third codebook and each corresponding entry in the first codebook is an array of data, the array comprising a set of eigenvectors defining a space within which said first station is to construct a precoding.

4. A wireless communications network in accordance with claim 3 wherein said precoding selection means is operable to determine a distance calculation between said substantially ideal precoding and entries in said third codebook, and to select said selected entry on the basis of said distance calculation.

5. A wireless communications network in accordance with claim 4 wherein said distance calculation comprises a measure of the extent to which said substantially ideal precoding is orthogonal to entries in said third codebook, and selecting that entry with the least orthogonality with said substantially ideal precoding.

6. A wireless communications network in accordance with claim 2 wherein the second indicator comprises a look up reference, the look up reference being suitable for use as a codebook index to an entry in the second codebook.

7. A wireless communications network in accordance with claim 2 wherein said entries in said first and second codebooks comprise matrices, and said entries in said third and fourth codebooks comprise matrices, wherein said first station comprises precoding construction means operable to construct a precoding comprising a matrix product of the matrix entry retrieved from the first codebook with the matrix entry retrieved from the second codebook.

8. A wireless communications network in accordance with claim 1 wherein the first station is operable to select a precoding on the basis of an entry corresponding with said first indicator, multiplied with an identity matrix.

9. A wireless communications network in accordance with claim 1 wherein the first indicator comprises a look up reference, the look up reference being suitable for use as a codebook index to an entry in the third codebook and an entry in the first codebook.

10. A wireless communications apparatus comprising:
a channel state measurement means for measuring the state of a channel over which a wireless communication is borne from a station to said apparatus,
first codebook storage means storing a first codebook comprising a plurality of entries, each entry comprising data representative of possible precodings,
precoding selection means operable to select an entry from said first codebook;
second codebook storage means storing a second codebook, wherein each entry in said second codebook is usable to specify a particular precoding from the possible precodings represented by the entry selected from the first codebook;
a selection device configured to select an entry in said second codebook by predicting the channel quality obtained when different entries in the second codebook are used to specify a precoding;
channel state indicator feedback means for emitting from said station an indicator corresponding to the entry selected from said first codebook and a second indicator corresponding to the entry selected from the second codebook, to enable another station to select a precoding on the basis of said indicators,
said second indicator enabling said another station to select, from a locally stored codebook corresponding to the second codebook, data representing criteria for the precoding to meet.

11. A wireless communications apparatus in accordance with claim 10, wherein the apparatus comprises channel precoder determining means operable to determine a substantially ideal precoding on the basis of the measured channel state,
wherein the substantially ideal precoding corresponds to a matrix of strongest channel eigenvectors, the channel precoder determining means being configured to transform the matrix of the strongest channel eigenvectors from an original domain to a transformed domain, wherein the dimension of the transformed domain is reduced compared to the original domain and
the precoding selection means is operable to select the entry from said first codebook based on the transformed matrix of strongest channel eigenvectors.

12. A non-transitory computer program product comprising computer executable instructions which, when loaded on a computer, cause the computer to become configured as apparatus in accordance with claim 10.

* * * * *